US010809157B2

(12) United States Patent
Lint et al.

(10) Patent No.: US 10,809,157 B2
(45) Date of Patent: Oct. 20, 2020

(54) AUTO-ADJUST CYLINDER USED WITH BEAD WIDTH ADJUSTING APPARATUS

(71) Applicant: AKRON SPECIAL MACHINERY, INC., Akron, OH (US)

(72) Inventors: Charles A. Lint, Massillon, OH (US); Benjamin E. Hillman, Canton, OH (US); Brian D. Mitchell, Akron, OH (US)

(73) Assignee: AKRON SPECIAL MACHINERY, INC., Akron, OH (US)

( * ) Notice: Subject to any disclaimer, the term of this patent is extended or adjusted under 35 U.S.C. 154(b) by 382 days.

(21) Appl. No.: 15/958,226

(22) Filed: Apr. 20, 2018

(65) Prior Publication Data

US 2019/0323925 A1 Oct. 24, 2019

(51) Int. Cl.
*G01M 17/02* (2006.01)
*B60C 25/00* (2006.01)

(52) U.S. Cl.
CPC ......... *G01M 17/021* (2013.01); *B60C 25/007* (2013.01)

(58) Field of Classification Search
None
See application file for complete search history.

(56) References Cited

U.S. PATENT DOCUMENTS

| | | | | |
|---|---|---|---|---|
| 5,107,702 A * | 4/1992 | Iwama | ................ | G01M 17/021 73/146 |
| 5,259,242 A * | 11/1993 | Folta | .................. | G01M 17/021 157/13 |
| 5,317,912 A | 6/1994 | Mallison | ........................ | 73/146 |
| 5,719,331 A | 2/1998 | Delmoro | ........................ | 73/146 |
| 5,992,227 A * | 11/1999 | Jellison | ............... | G01M 17/021 73/146 |
| 6,089,084 A * | 7/2000 | Nishihara | ........... | G01M 17/021 73/146 |
| 6,584,877 B1 | 7/2003 | Poling, Sr. et al. | ............ | 82/101 |
| 6,658,936 B2 * | 12/2003 | Matsumoto | ........... | G01M 1/045 73/460 |
| 6,988,397 B1 * | 1/2006 | Delmoro | ............. | G01M 17/021 157/16 |
| 7,240,543 B2 * | 7/2007 | Cargould | ............ | G01M 17/021 73/146 |

(Continued)

FOREIGN PATENT DOCUMENTS

EP  1 030 169 A2  8/2000  ............ G01M 17/02

OTHER PUBLICATIONS

International Search Report dated Jul. 12, 2019 in related application No. PCT/US2019/019510.

(Continued)

*Primary Examiner* — Natalie Huls
*Assistant Examiner* — Jermaine L Jenkins
(74) *Attorney, Agent, or Firm* — Renner Kenner Greive Bobak Taylor & Weber (57) ABSTRACT

A chucking apparatus for positioning a tire in a tire uniformity machine includes an upper chuck assembly, a lower chuck assembly operative with the upper chuck assembly to capture a tire therebetween, and a dual piston cylinder coupled to the lower chuck assembly which moves the tire into engagement with the upper chuck assembly. The dual piston cylinder has an axially extending inner piston rod from which axially extends a field-replaceable inner piston stem.

18 Claims, 7 Drawing Sheets

(56) References Cited

U.S. PATENT DOCUMENTS 8,794,059 B2 * 8/2014 Wollbrinck ......... G01M 17/021
              73/146
9,199,519 B2 * 12/2015 Bonacini ............ B60C 25/0545
9,594,003 B2 * 3/2017 Tachibana ........... G01M 17/021

OTHER PUBLICATIONS

Written Opinion dated Jul. 12, 2019 in related application No. PCT/US2019/019510.

* cited by examiner

AUTO-ADJUST CYLINDER USED WITH BEAD WIDTH ADJUSTING APPARATUS

TECHNICAL FIELD

This invention relates to tire testing and tire uniformity machines used to conduct such testing in particular, and more specifically relates to an auto-adjust cylinder for quickly and accurately chucking a tire in such a machine prior to testing in order to accommodate tires of differing bead width spacing.

BACKGROUND ART

While the present invention is not necessarily limited to tire uniformity machines, it does have particular applicability to such machines. Such tire uniformity machines commonly include an upper rim and a lower rim disposed in opposed relationship with the lower rim being movable toward and away from the upper rim.

The lower rim is initially disposed at the level of a conveyor and receives each tire to be tested from the conveyor with the tire bead seated on the rim, following which the rim and tire are elevated and the opposite bead of the tire engages the upper rim. To that end, the lower rim generally carries a centering cone engageable with a central recess in the upper rim so as to accurately position the rims with respect to each other.

Once the tire is positioned and inflated, the upper rim is rotated at a predetermined speed and a load wheel is moved into and out of engagement with the tire tread so as to load the tire, simulating actual operating conditions. A number of sensing and testing apparatus are usually associated with these machines in order to measure various characteristics of the tire under such simulated operational conditions.

Precision is, of course, of paramount importance in any testing procedure, and proper seating of the tire is, therefore, critical to the accurate testing in this procedure. Moreover, the problem of attaining this precision is compounded in the usual tire manufacturing facility because tires are presented to the testing machine conveyor on a more or less continuous basis and having test requirements at a variety of different bead width spacings, often from one tire to the next. Inasmuch as it is desirable to provide means for accommodating these different bead width spacings, it becomes necessary to somehow adjust the gap between the upper and lower rims.

The most basic method of changing bead width spacings is to manufacture rims having a specific fixed bead width spacing. The rims are then changed to accommodate different bead width spacings. Another practice common to the prior art has been to adjust the bead width by removing the cones from the socket in the lower rim assembly and replacing them with ones of different lengths. In that fashion, the spacing between the upper and lower rims, when the unit is closed, can be adjusted. Obviously, however, both methods are time consuming and not really practical in a production scenario where the operation is intended to be substantially continuous and down time is to be avoided.

Another prior art solution to this problem is to provide for raising the lower rim until the space between the upper and lower rims is less than the required bead width spacing, inflating the tire and then lowering the lower rim to the required bead width spacing. This is accomplished by a series of sensors and control devices which will sense the width of the tire and adjust to the desired rim spacing. The difficulty with this approach is primarily a lack of speed and, in a production setting, it is desirable to be able to make the adjustment quickly so as to not interfere with the production line operation.

One attempt at solving the aforementioned problems is disclosed in U.S. Pat. No. 5,719,331 entitled Bead Width Adjusting Apparatus For Tire Uniformity Machines, which is incorporated herein by reference. This prior art configuration is presented in FIG. 1 where a bead width adjusting apparatus is designated generally by the numeral 10 and is carried by a tire uniformity machine, a portion of which is designated by a frame 12. The apparatus 10 receives a tire designated by capital letter T which has opposed beads, each of which is designated by capital letter B, which form an inner diameter of the tire wherein the apparatus 10 engages the opposed beads and seals the tire for inflation, testing, and inspection. The tire is delivered to the apparatus 10 by a conveyor table (not shown).

Figure 1:
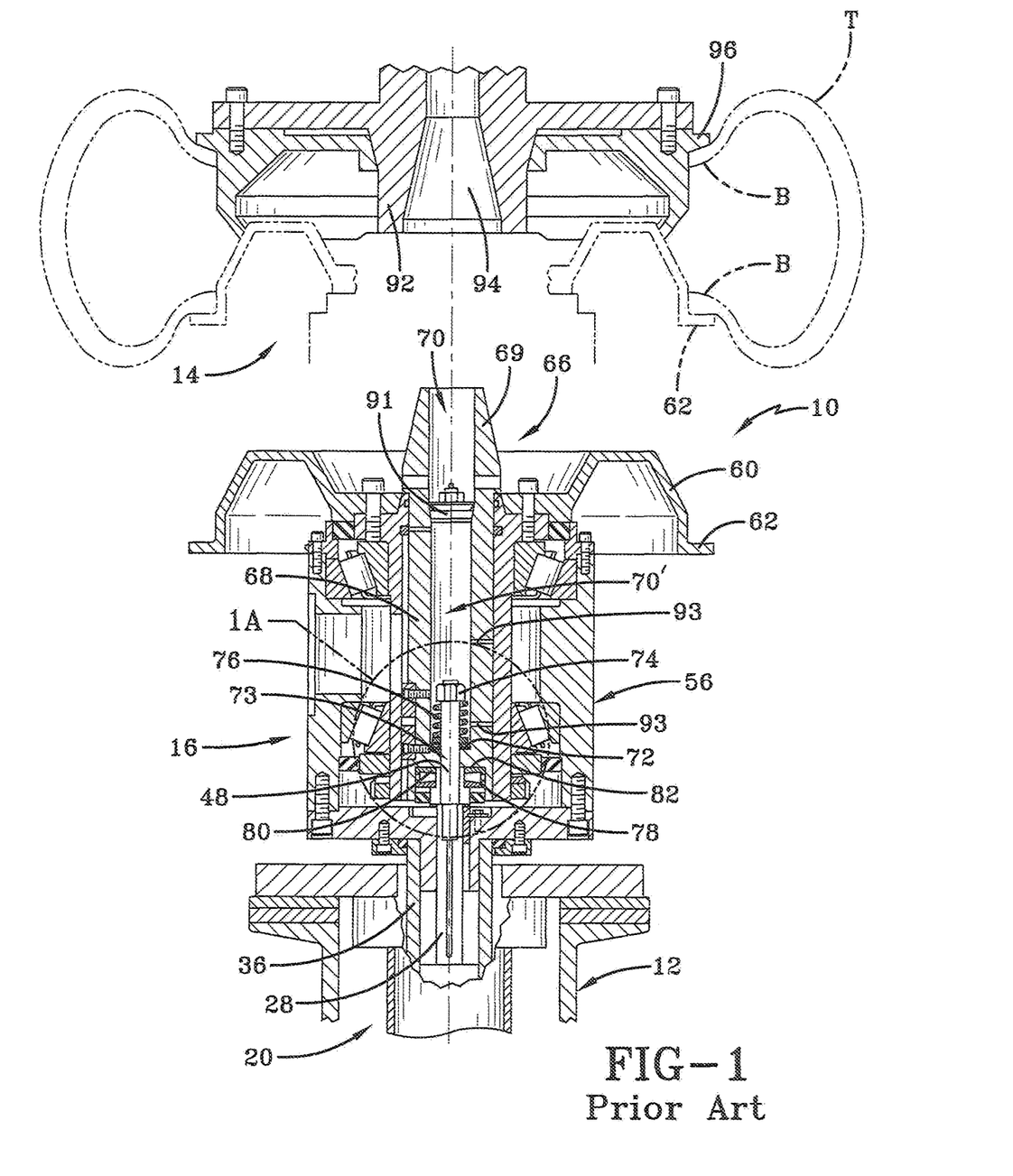
FIG. 1 is an elevational view of a Prior Art bead width adjusting apparatus.

The apparatus 10 includes an upper chuck assembly 14 positioned above the conveyor table (not shown) and a lower chuck assembly 16 positioned beneath the table, wherein the table has an opening therethrough which the lower chuck assembly 16 may extend into and retract from as needed to engage the tire T when it is positioned immediately above the chuck assembly 16.

Figure 2:
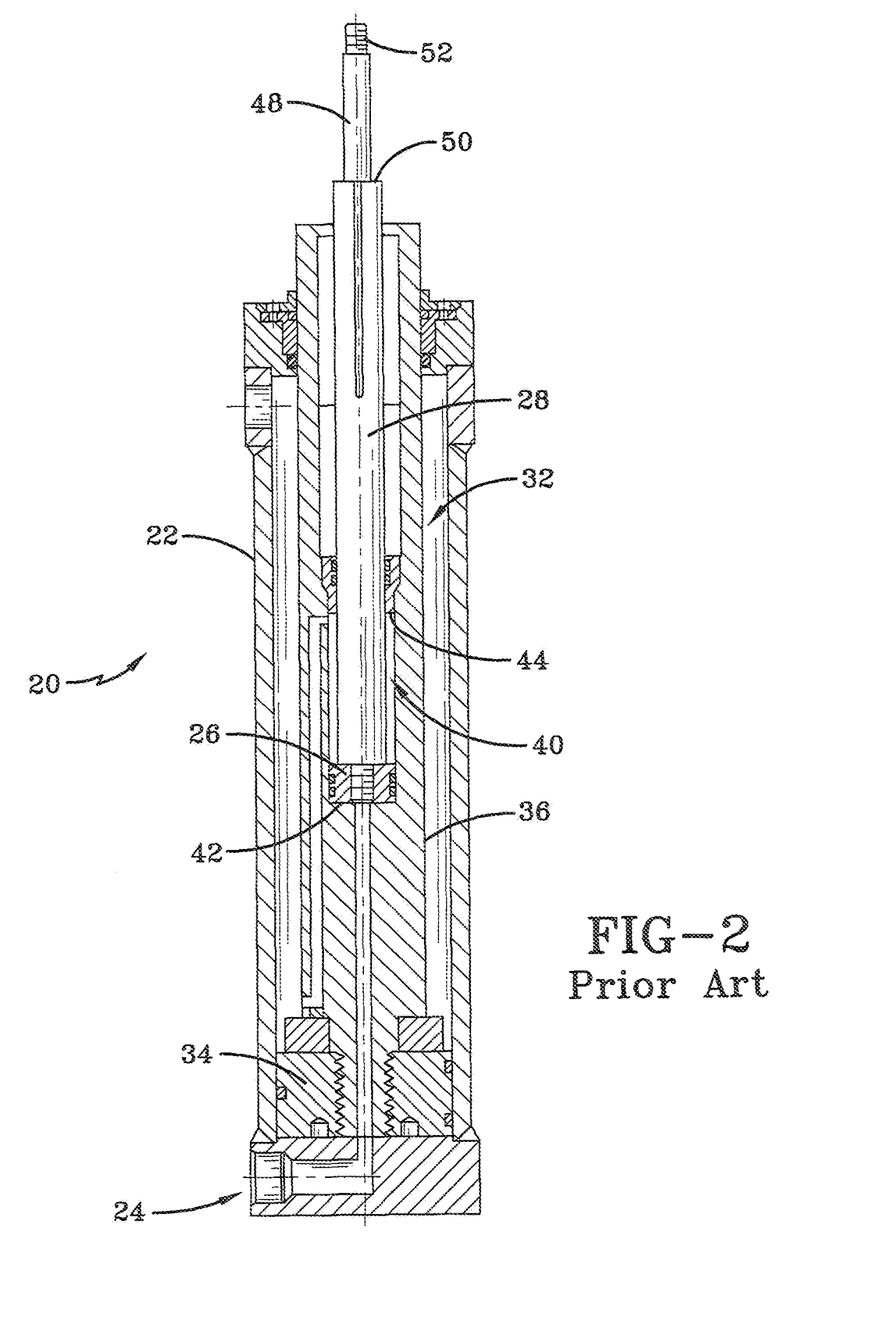
FIG. 2 is a sectional view of a Prior Art dual piston cylinder used in conjunction with the Prior Art bead width adjusting apparatus.

As best seen in FIGS. 1 and 2, a dual piston cylinder designated generally by the numeral 20 is connected to and supports the lower chuck assembly 16. The dual piston cylinder 20 includes a cylinder housing 22 which provides for a hydraulic fluid port 24 that receives hydraulic fluid so as to operate pistons maintained within the piston cylinder 20. In particular, the dual piston cylinder includes an inner piston cylinder 26 from which axially extends an inner piston rod 28. The cylinder housing 22 forms an outer chamber 32 which slidably receives an outer piston cylinder 34 from which extends an outer piston rod 36. The outer piston rod 36 is annularly maintained within the outer chamber 32. The outer piston cylinder forms an inner chamber 40 in which the inner piston cylinder 26 and the inner piston rod 28 are slidably received and axially movable therein. The outer chamber 32 also forms an inner chamber seat 42 upon which the inner piston cylinder 26 rests. The inner chamber 40 also provides an inner chamber seal 44 axially removed from the inner chamber seat 42. The seat 42 and the seal 44 define a stroke which allows for extension and retraction of the inner piston rod 28 with respect to the outer chamber 32. In other words, as hydraulic fluid fills the dual piston cylinder, the hydraulic fluid first engages the inner piston cylinder 26 so as to move it axially upward. Sometime after the inner piston cylinder begins to move, the hydraulic fluid fills the dual piston cylinder in such a manner so as to move the outer piston cylinder 34 and the attached outer piston rod 36 axially upward. As will be discussed in detail later, this action by the inner piston rod and outer piston rod serves to raise the lower chuck assembly 16 so as to engage the tire.

The inner piston rod 28 includes an axially extending stem 48 which extends from a stem ledge 50. The stem 48 may include or provide a threaded end 52 opposite the stem ledge 50.

Figure 1A:
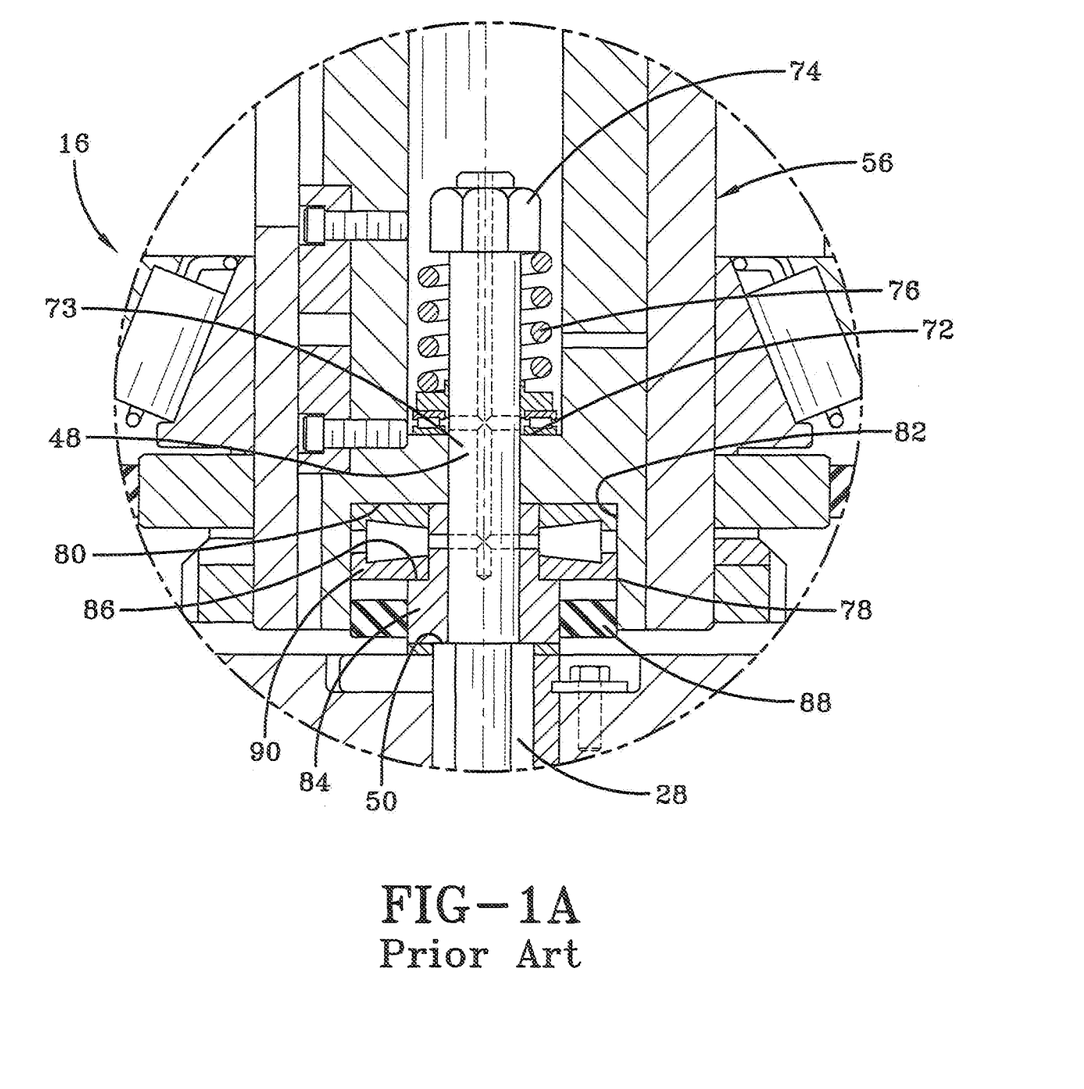
FIG. 1A is a detailed view of an inner piston rod and associated biasing mechanisms utilized in the Prior Art bead width adjusting apparatus.

Referring back to FIG. 1, it can be seen that the lower chuck assembly 16 includes an outer spindle apparatus 56 secured to the outer piston rod 36 at one end, wherein the opposed end of the spindle apparatus 56 is connected to a lower rim 60. The lower rim 60 provides for a radially extending lip 62 which seals the lower bead of the tire when the assemblies are brought together. Rotatably received within the outer spindle apparatus 56 is an inner spindle apparatus 66 which is biasingly secured to the inner piston rod 28 and in particular to the stem 48. Extending axially from the inner spindle apparatus 66, at an end opposite the stem 48, is an elongate nose cone shaft 68, which has a tapered nose 69, which axially moves and rotates with the inner spindle apparatus. The nose cone shaft 68 has an axial cone opening 70 therethrough. A base seat 72 extends radially inward from an inner surface of the nose cone shaft 68 that forms the cone opening 70. The base seat 72 provides a stem opening 73 that slidably receives the stem 48. As best seen in the detailed drawing FIG. 1A, a fastener 74 connects to the threaded end 52 so as to secure the inner piston rod 28 to the inner spindle apparatus 66. In the embodiment shown, a spring 76 may be interposed between a lower surface of the fastener 74 and the base seat 72.

At an end of the inner spindle apparatus 66 positioned opposite the lower rim 60 an end bore 78 may be provided. The end bore 78 may include an axial end bore surface 80 from which substantially perpendicularly extends an end bore sidewall 82. A spacer 84 may be carried by the inner piston rod's stem ledge 50. The spacer 84 provides for a spacer ledge 86. A seal 88 may annularly extend between an outer radial surface of the spacer and the end bore sidewall 82. A thrust bearing 90 may be positioned between the end bore surface 80 and the spacer ledge 86.

A plug with a grease zerk 91 is received in the cone opening 70. An area 70' in the opening between the zerk 91 and the base seat 72 is filled with grease so as to lubricate the slidable movement of the stem 48 in the stem opening 73. The nose cone shaft also has cross-lube holes 93 in selected locations so that grease may be fluidly transferred between the area 70' and an outer surface of the nose cone shaft 68.

The inner chuck assembly 16 and the nose cone 68 are axially aligned with the upper chuck assembly 14. The upper chuck assembly 14 includes a body section 92 with a recess 94 axially aligned to receive the nose cone 68. Those skilled in the art will appreciate that an air supply is connected through the recess 94 and flows into the tire T for inflation thereof. The body section 92 provides for an upper rim 96 that engages and seals the upper bead of the tire when the chuck assemblies are brought together.

In operation, the chucking apparatus 10 is associated with a control system associated with the tire uniformity machine. The size of the tire and other related information about the tire is received by the control system prior to the tire entering the chucking apparatus. This information is then used to determine the bead width of the received tire. Once the tire is positioned between the upper and lower chuck assemblies, the control system causes hydraulic oil or fluid to flow into the dual piston cylinder 20 such that the inner piston extends upwardly. This causes the nose cone to immediately extend upwardly and soon afterward the outer piston rod begins to extend causing the tire to be received on the lower rim 60. As the piston rods 28 and 36 are extending, sensors associated with the uniformity machine track the movement of the lower chuck assembly 16 and feeds that information back to the control system. Next, the lower chuck assembly continues to rise until the nose cone is firmly seated in the recess of the upper chuck assembly. At this time, the hydraulic fluid continues to be directed into the dual piston cylinder until an appropriate force is created between the nose cone and the upper chuck assembly. When the nose cone is firmly seated, the lower rim reaches a predetermined tire inflation position whereupon the tire can be inflated. As the tire is inflated through the recess 94, the control system moves the lower rim via the outer piston rod 36 and the inner piston rod 28 as needed to the set position as provided in the predetermined information. As a result, the tire is precisely positioned to accommodate different bead width spacings. At this time, any appropriate testing and inspection may take place for the inflated tire.

Once the testing is completed, the fluid is withdrawn from the dual piston cylinder. As this occurs, the fastener 74 and associated spring 76 pull the elongated nose cone downwardly and a significant force is applied to the inner piston rod 28 and the associated biasing components, namely the spring and the thrust bearing 90.

Although the chucking assemblies and apparatus described above are effective, the design and construction of the inner piston rod and associated mechanism for attachment to the nose cone present a number of problems. Specifically, the operational stresses applied to the inner piston rod and associated biasing mechanisms result in breakage of the inner piston rod. Another drawback is believed to be a result of inadequate lubrication reaching areas around the spring 76 and the thrust bearing 90. As a result, the spring 76 and bearing 90 break after extensive use and the broken pieces then result in breakage of the stem. As a result, significant downtime is encountered to replace the inner piston rod and this replacement part is quite expensive. Moreover, to ensure precise positioning of the inner piston rod to the outer piston rod, the inner piston cylinder must be sized with respect to the other components of the dual piston cylinder. As such, if the inner piston cylinder and/or inner piston rod break, the whole dual piston cylinder 70 needs to be replaced.

Therefore, there is a need in the art for an inner piston rod utilized within a dual piston cylinder which absorbs stress better, has improved lubrication, and is less prone to breakage, and furthermore which allows for on-site replacement of just the inner piston cylinder, or a portion of the inner piston cylinder, instead of total replacement of the dual piston cylinder.

SUMMARY OF THE INVENTION

In light of the foregoing, it is a first aspect of the present invention to provide an auto-adjust cylinder used with bead width adjusting apparatus.

It is another aspect of the present invention to provide a chucking apparatus for positioning a tire in a tire uniformity machine, the apparatus comprising an upper chuck assembly, a lower chuck assembly operative with the upper chuck assembly to capture a tire therebetween, and a dual piston cylinder coupled to the lower chuck assembly so as to move the tire into engagement with the upper chuck assembly, the dual piston cylinder having an axially extending inner piston rod from which axially extends a field-replaceable inner piston stem.

Yet another aspect of the present invention is to provide a lower chuck assembly used in a chucking apparatus of a tire uniformity machine comprising a dual piston cylinder having an axially movable outer piston rod, an inner piston rod axially movable with respect to the outer piston rod, the inner piston rod having a stem opening, an inner piston stem detachably received in the stem opening and extending axially from the inner piston rod, and a nose cone shaft having a nose cone opening therethrough which slidably receives the inner piston stem.

BRIEF DESCRIPTION OF THE DRAWINGS

These and other features and advantages of the present invention will become better understood with regard to the following description, appended claims, and accompanying drawings wherein:

BEST MODE FOR CARRYING OUT THE INVENTION

Figure 3:
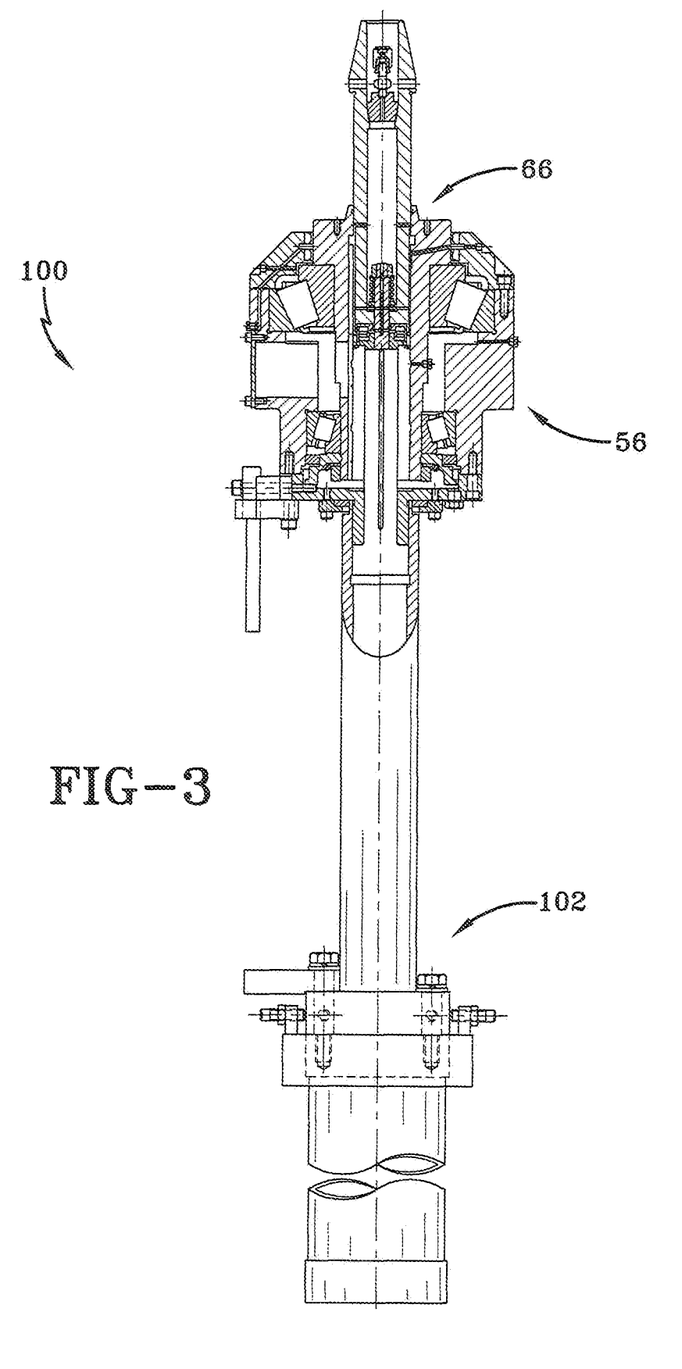
FIG. 3 is an elevational view of a lower chuck assembly, which is part of a chucking apparatus, shown in partial cross-section, according to the concepts of the present invention.

Referring now to FIG. 3, it can be seen that a lower chuck assembly is designated generally by the numeral 100. The lower chuck assembly 100 may be utilized in the chucking apparatus 10 shown in FIGS. 1 and 2. As will be appreciated as the detailed description proceeds, the lower chuck assembly 100 has a number of modifications different than the lower chuck assembly 16 previously described. Generally, the lower chuck assembly 100 and selected components provide for advantages to overcome the deficiencies noted in the prior art chuck assembly discussed above.

Referring now to FIGS. 3, 4, 4A, 5 and 6, it can be seen that a dual piston cylinder is designated generally by the numeral 102. The cylinder 102 may be utilized with the lower chuck assembly and incorporates most of the same components as in the prior art but some components are configured differently as will be discussed. And the dual piston cylinder is still operative with the upper chuck assembly 14 through the lower chuck assembly. In particular, the dual piston cylinder 102 provides an inner piston rod 106. A number of the outer components of the dual piston cylinder 102 are similar or the same as the dual piston cylinder 20. In particular the cylinder housing 22, the hydraulic fluid port 24, the inner piston cylinder 26, the outer chamber 32, the outer piston cylinder 34, the outer piston rod 36, the inner chamber 40, the inner chamber seat 42, and the inner chamber seal 44 are substantially similar in the dual piston cylinder 102, as in the dual piston cylinder 20. Skilled artisans will appreciate that there may be some modifications in the placement of various components, but that the overall operation of the dual piston cylinder 102 is similar to that of the dual piston cylinder 20 in that it is utilized to elevate the lower chuck assembly 16 into operation with the upper chuck assembly 14 as described in the background art.

Figures 4, 4A:
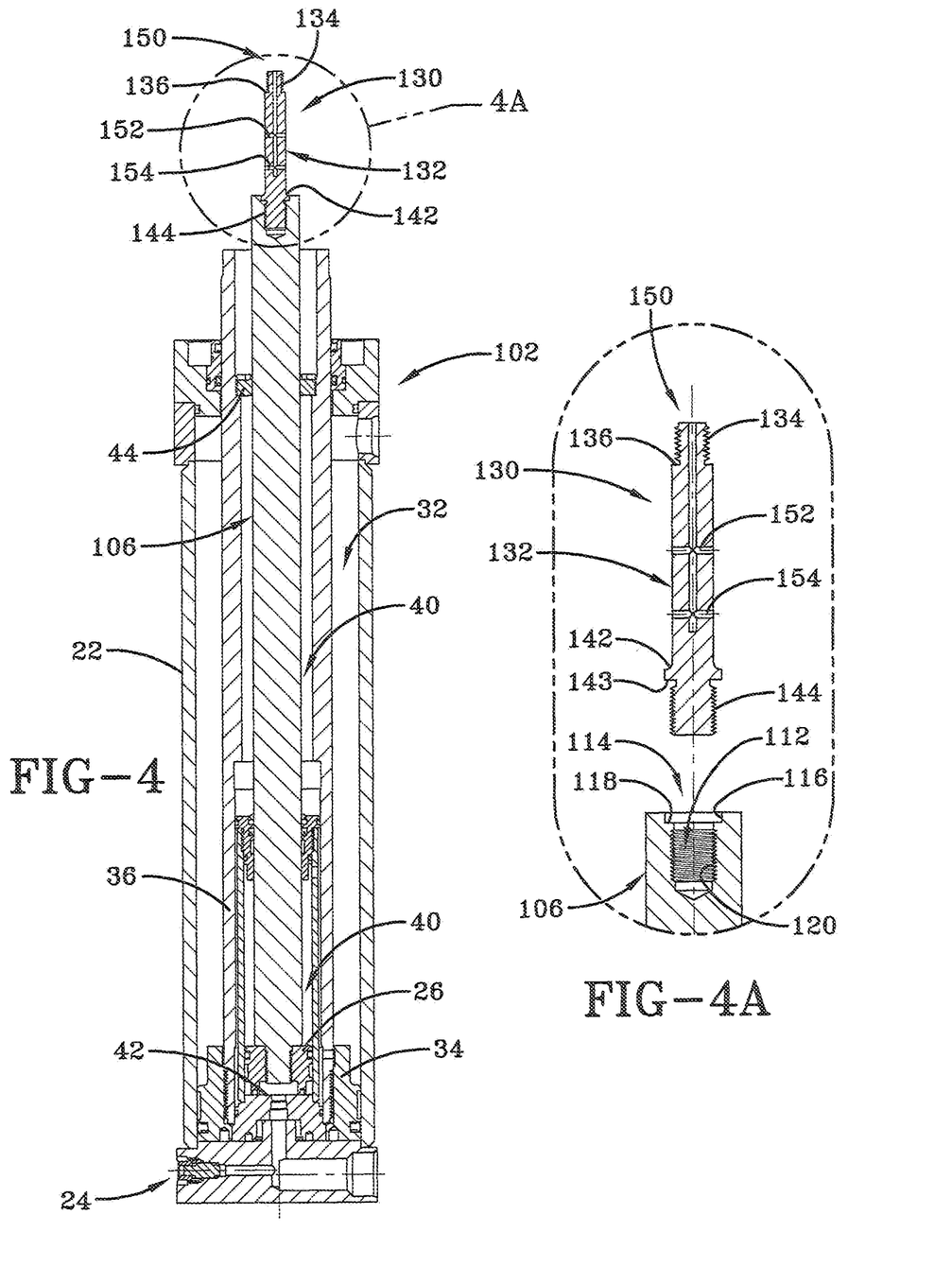
FIG. 4 is an elevational view of a dual piston cylinder utilized in the lower chuck assembly in a collapsed position according to the concepts of the present invention.
FIG. 4A is an enlarged and exploded view of an inner piston rod extending from the dual piston cylinder according to the concepts of the present invention.
Figure 5:
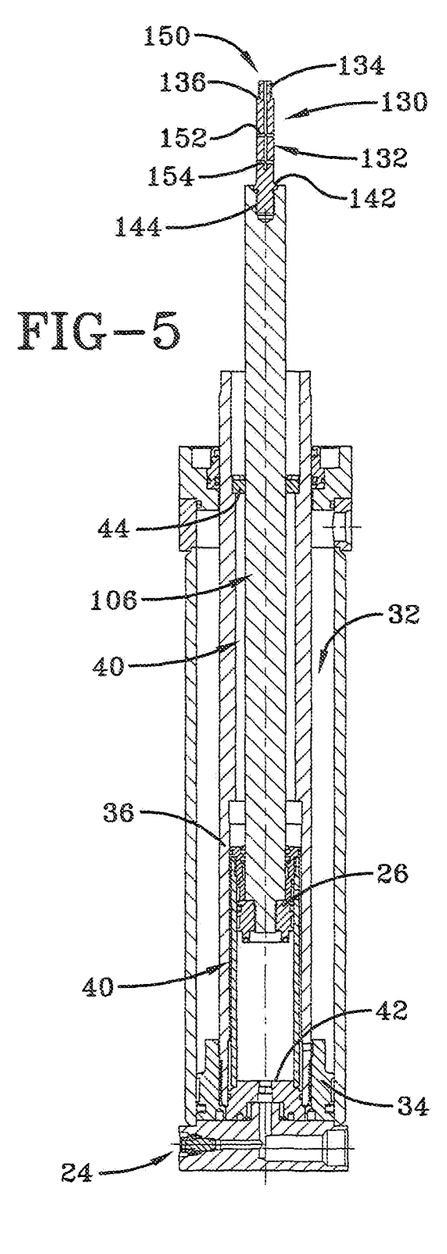
FIG. 5 is an inner piston rod partially extended, which is part of a chucking apparatus, shown in partial cross-section according to the concepts of the present invention.
Figure 6:
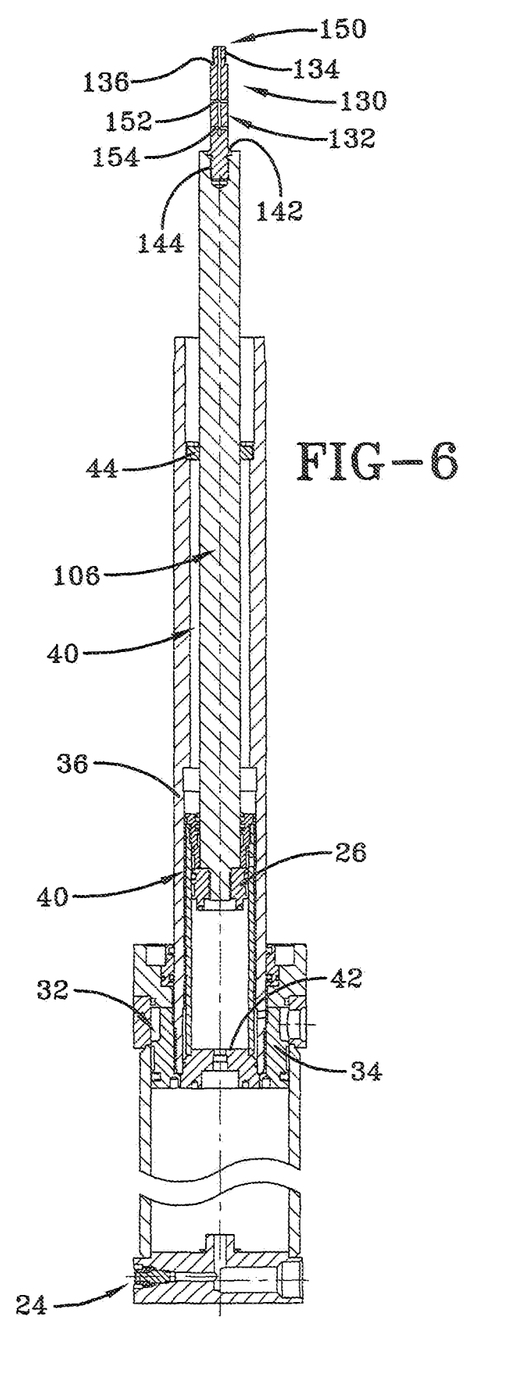
FIG. 6 is an inner piston rod and an outer piston rod utilized in the lower chuck assembly in a fully extended position according to the concepts of the present invention.

The inner piston rod 106 is distinguishable from the inner piston rod 28 provided by the prior art configuration. In particular, the rod 106 provides for an axial stem opening 112. The opening 112 is formed by a stem bore 114 which includes a bore radial surface 116 from which substantially perpendicularly extends a bore axial surface 118. The bore 114 may further include a rod internal surface 120 which, in some embodiments, may be provided with internal threads.

Received in the stem opening 112 is a field-replaceable inner piston stem designated generally by the numeral 130. The stem 130 includes a stem body 132 which at one end has a nut end 134 which may be threaded. Extending substantially perpendicularly from the stem body 132 is a landing surface 136 which may be in proximity to the nut end 134 and in particular to the lowermost thread, if provided. Extending substantially perpendicularly from the stem body 132 is also a collar 142 wherein the collar 142 fits in the bore radial surface 116 and wherein a lower edge 143 of the collar 142 comes in contact with the bore axial surface 118. Further extending from the collar 142 may be a threaded shaft 144 which is received in the stem bore 114 and meshes with the rod internal surface 120.

As best seen in FIG. 4A, the threaded shaft 144 is detachably received in the axial stem opening 112 and in particular the rod internal surface 120. This allows for in-field replacement of the inner piston stem 130 in the event it becomes damaged or broken during use.

The inner piston stem 130 also provides for an axial orifice 150 which extends internally through the stem body from the nut end 134 to a position just above the collar 142. In some embodiments, a mid-cross bore 152 extends transversely through the stem body 132 and intersects with the axial orifice 150. And, in some embodiments, a lower-cross bore 154 may extend transversely through the stem body 132 and also intersects with the axial orifice 150. The lower-cross bore 154 is positioned between the mid-cross bore 152 and the collar 142. The purpose of the axial orifice 150, the mid-cross bore 152, and the lower-cross bore 154 will become apparent as the detailed description proceeds.

Figure 7:
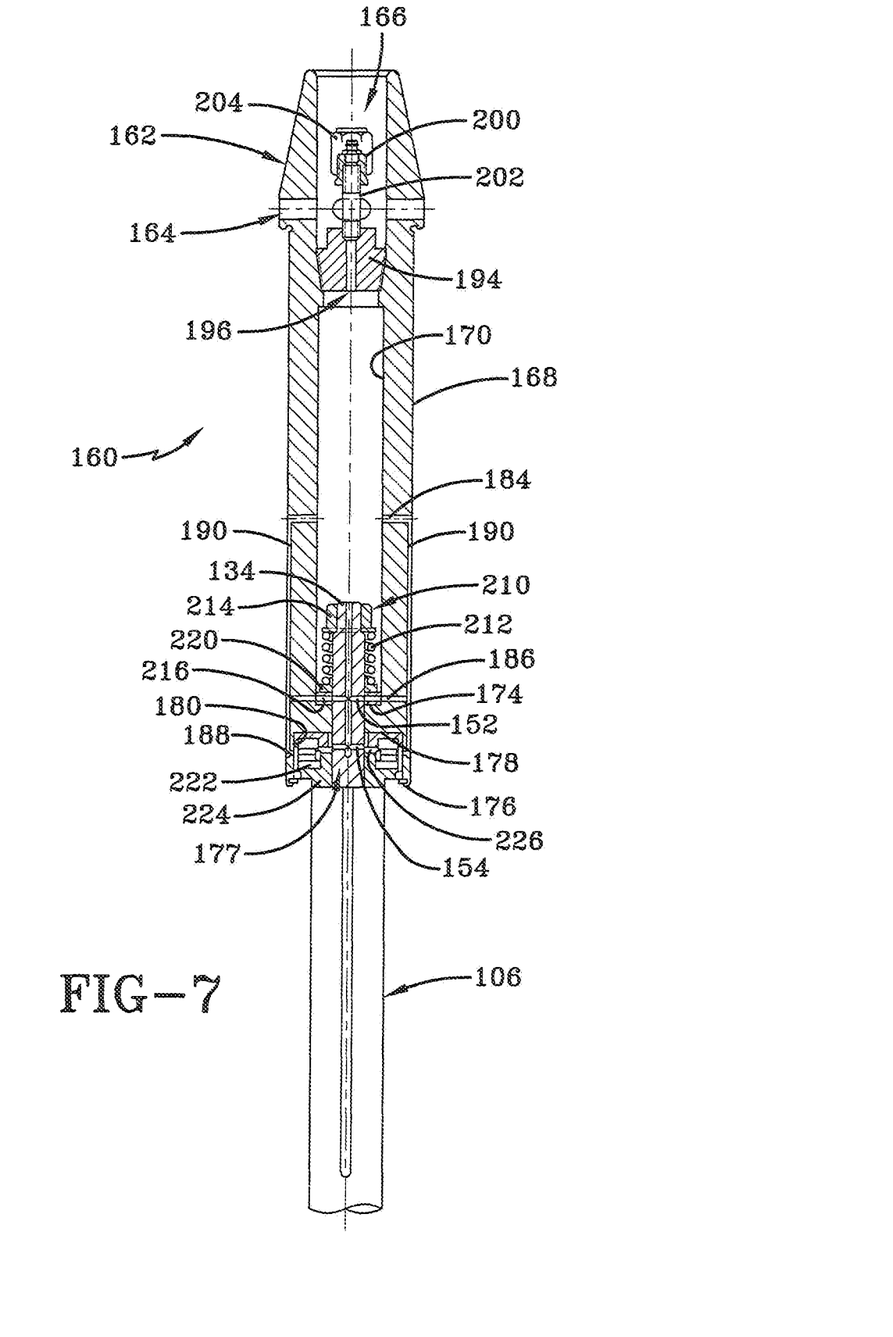
FIG. 7 is a cross-sectional view of a nose cone shaft connected to the inner piston rod of the dual piston cylinder according to the concepts of the present invention.

Referring now to FIG. 7, it can be seen that a nose cone shaft is designated generally by the numeral 160. The shaft 160 is similar to the prior art shaft or elongate nose cone 68 as described above. However, there are several modifications for use with the inner piston rod 106 and other features as will be described. The shaft 160 includes a conical nose cone 162 at one end. Extending transversely through the conical nose 160 is a nose-cross bore 164. Extending axially through the nose cone shaft 160 is a nose cone opening 166. The shaft 160 provides for an outer wall 168 and an inner wall 170 which may form the nose cone opening 166. At an end of the opening 166 opposite the conical nose 162 is an inwardly extending base seat 174. In the embodiment shown, the base seat 174 extends substantially perpendicularly inwardly from the inner wall 170.

At an opposite end of the conical nose 162, the nose cone shaft 160 provides for a stem end 176. Extending from the base seat 174 through to the stem end 176 is a stem opening 177, which is coaxial with the nose cone opening 166, wherein the opening 177 slidably and rotatably receives the stem body 132 of the inner piston stem 130. Extending axially inwardly from the stem end 176 is a spacer sidewall 180. Extending radially inward from the spacer sidewall 180 to the stem opening 177 is a spacer seat 178.

Extending completely through the nose cone shaft 160, from the outer wall 168 to the inner wall 170, may be a shaft lube hole 184 which is positioned at about a mid-point between the stem end 176 and the conical nose 162. As shown, the shaft lube hole 184 extends diametrically through the nose cone shaft, but in some embodiments any number of holes 184 may be provided and they may extend in any radial direction. Also extending transversely through the nose cone shaft 160 from the outer wall to the inner wall may be a spring lube hole 186 which is positioned to be about slightly above the base seat 174. And extending through the nose cone shaft 160 in proximity to the stem end 176 is a spacer lube hole 188 which is positioned to be about slightly below the spacer seat 178. As with the other lube holes 184 and 186, the hole 188 extends transversely through the nose cone shaft 160 from the outer wall to the inner wall 170. And as with the lube hole 184, the lube holes 186 and 188 may extend diametrically through the nose cone shaft, may be of any number and may extend in any radial direction.

The nose cone shaft 160 also provides for lube channels 190 on either side thereof. The lube channels 190 extend from the shaft lube hole 184 to the spring lube hole 186 and the spacer lube hole 188. The channels 190 are configured to intersect with the openings provided by the holes 184, 186, and 188 so as to facilitate the flow of lubricating material on an outer surface of the nose cone shaft 160 when it is received in the inner spindle apparatus 66 as best seen in the prior art drawing of FIG. 1. It will also be appreciated that the channels 190 may only intersect with selected lube holes 184, 186, and 188. And in some embodiments the lube channels 190 may be in the form of a reduced diameter of the shaft 160 so as to be fluidly connected with all of the lube holes 184, 186, and 188.

Received in the nose cone opening 166 is a nose cone plug 194 which has a plug hole 196 extending axially therethrough. Secured to an upper end of the nose cone plug 194 is a grease fitting 200, which may also be referred to as a grease zerk. Extending between the plug 194 and the fitting 200 may be an extension 202. The extension serves to provide easier access to the fitting in the event debris accumulates in the opening 166. Skilled artisans will appreciate that a zerk cap 204 may be used to enclose the zerk 200 so as to prevent contaminants from entering therein. The cap also prevents the air pressure generated while testing a tire from forcing open the grease zerk and removing grease from the cavity. Prior to operation of the lower chuck assembly, skilled artisans will appreciate that the interior of the nose cone shaft from the plug 194 to the base seat 174 is filled with lubricating fluid. This is accomplished by filling the interior of the nose cone opening 166, which is sealed by the nose cone plug 194, with lubricating fluid through the fitting 200. As the lubricating fluid is filled within the nose cone shaft it will emanate outwardly from the shaft lube hole 184 and the spring lube hole 186 into the channels 190. Moreover, it will be appreciated that the lubricating fluid will be received into the axial orifice 150 and flow therethrough into the rib-cross bore 152 and the lower-cross bore 154. Depending on movement of the nose cone shaft 160 and movement of components external and internal to the shaft, the lubricating fluid may also flow in any direction through the various holes, bores, channels, and orifice.

A biasing mechanism is designated generally by the numeral 210 and may be received on the stem body 132. In particular, the biasing mechanism 210 includes a spring 212 which may fit around the stem body 132. A locknut 214 may be received on the threaded nut end 134 so as to hold the spring 212 between the locknut and the base seat 174. Positioned between an end of the spring 212 and the base seat 174 may be a base needle thrust bearing 216. Also provided between the spring 212 and the base seat may be a seat bushing 220 which is interposed between the needle thrust bearing and the end of the spring 212, wherein the stem body extends through openings provided by the base needle thrust bearing and the spacer. Moreover, it will be appreciated that the needle thrust bearing 216 and the seat bushing 220 are aligned with the spring lube hole 186 and also the mid-cross bore 152 of the stem body 132. As a result, the lubricating fluid is purposefully directed into the biasing mechanism 210 which undergoes a significant amount of mechanical stress during operation of the lower chuck assembly.

Received in an area formed by the spacer sidewall 180 and the spacer seat 178 is a spacer needle thrust bearing 222, and a stem spacer 224 which may partially enclose the needle thrust bearing. Extending transversely through the stem spacer 224 is a spacer cross hole 226 which is generally aligned with the lower-cross bore 154 and the spacer lube hole 188. This alignment of the cross hole 226, the lower-cross bore 154, and the spacer lube hole 188 also delivers a lubricating fluid to an area of significant mechanical stress during operation of the lower chuck assembly. Indeed, the alignment of the lube holes 186 and 188 with the corresponding cross bores 152 and 154 facilitate the flow of lubricating fluid from the nose cone opening 166 to the exterior of the nose cone shaft 160 via the lube channels 190. This alignment facilitates the flow of lubricating fluid in and around the thrust bearing and the spring 212.

As noted previously, in operation, the inner piston stem is threaded into the thread opening of the inner piston rod. The nose cone shaft, which is part of the inner spindle apparatus, is slidably assembled to the stem 130 and held in place by the locknut 214. As the inner piston rod 28 is extended and retracted with respect to the outer piston rod during the chucking operation, the nose cone shaft is also extended and retracted. In other words, when the inner piston rod is retracted, the spring 212 is slightly compressed and these forces are further absorbed by the needle thrust bearing 222 and the base needle thrust bearing 216. This extension and retraction of movement of the nose cone shaft facilitates movement of the lubricating fluid between the nose cone opening and the exterior of the nose cone shaft. It will further be appreciated that the nose cone shaft may also be undergoing rotation by the inner spindle apparatus with respect to the outer spindle apparatus. This further facilitates the flow of lubricating fluid therebetween. With the alignment of the cross-bores 152 and 154 with respect to the lube holes 186 and 188, the thrust bearings are adequately lubricated along with the spring 212. This significantly reduces the amount of stress absorbed by the inner piston stem. In the event abnormal stresses are subjected to the inner piston stem and it bends or breaks, the inner piston stem can now be easily replaced in contrast to the configuration of the prior art. This is accomplished by removing the nose cone plug from the nose cone opening 166, evacuating any lubricant that remains, and loosening the locknut 214. The nose cone shaft is then removed, whereupon the broken inner piston stem may be removed. A new inner piston stem can then be installed and the nose cone shaft is re-installed. Skilled artisans will appreciate that this is advantageous in that entire dual piston cylinder does not need to be disassembled from the lower chuck apparatus, thus saving a significant amount of down time of the tire uniformity machine.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A chucking apparatus for positioning a tire in a tire uniformity machine, the apparatus comprising:
    an upper chuck assembly;
    a lower chuck assembly operative with said upper chuck assembly to capture a tire therebetween; and
    a dual piston cylinder coupled to said lower chuck assembly so as to move the tire into engagement with said upper chuck assembly, said dual piston cylinder having an axially extending inner piston rod from which axially extends a field-replaceable inner piston stem.

2. The chucking apparatus according to claim 1, said lower chuck assembly further comprising:
    a nose cone shaft having a nose cone opening extending axially therethrough formed by an inner wall, wherein a base seat extends inwardly from said inner wall;
    a locknut secured to an end of said field-replaceable inner piston stem;
    a needle thrust bearing carried by said base seat; and
    a spring interposed between said locknut and said needle thrust bearing.

3. The chucking apparatus according to claim 2, wherein, said nose cone shaft has a spring lube hole extending transversely therethrough and aligned with said needle thrust bearing to deliver lubricating fluid in a vicinity thereof.

4. The chucking apparatus according to claim 3, wherein said field-replaceable inner piston stem comprises:
    a stem body having a nut end opposite a collar that is secured to said inner piston rod, said stem body having a mid-cross bore extending transversely therethrough and substantially aligned with said spring lube hole.

5. The chucking apparatus according to claim 4, wherein said stem body has an axial orifice that intersects with said spring lube hole to facilitate passage of lubricating fluid therethrough.

6. The chucking apparatus according to claim 1, said lower chucking apparatus comprising:
    a nose cone shaft having a nose cone opening extending axially therethrough formed by an inner wall, wherein a spacer seat extends inwardly from said inner wall;
    a spacer having a spacer cross hole extending transversely therethrough, said spacer positioned adjacent said spacer seat;
    a needle thrust bearing received between said spacer and said spacer seat; and
    said field-replaceable inner piston stem extending through said needle thrust bearing and said spacer.

7. The chucking apparatus according to claim 6, wherein said nose cone shaft has a spacer lube hole extending transversely therethrough and aligned with said spacer cross hole to deliver lubricating fluid in a vicinity thereof.

8. The chucking apparatus according to claim 7, wherein said field-replaceable inner piston stem comprises:
    a stem body having a nut end opposite a collar that is secured to said inner piston rod, said stem body having a lower-cross bore extending transversely therethrough and substantially aligned with said spacer cross hole.

9. The chucking apparatus according to claim 8, wherein said stem body has an axial orifice that intersects with said lower-cross bore to facilitate passage of lubricating fluid therethrough.

10. The chucking apparatus according to claim 1, said lower chucking assembly further comprising:
    a nose cone shaft having a nose cone opening extending axially therethrough formed by an inner wall, and a spring lube hole and a spacer lube hole extending transversely through said inner wall;
    said field-replaceable inner piston stem extending into said nose cone opening, said field replaceable inner piston stem having an axial orifice, and a mid-cross bore and a lower-cross bore extending transversely therethrough and intersecting with said axial orifice, said mid-cross bore substantially aligned with said spring lube hole, and said lower-cross bore substantially aligned with said spacer lube hole.

11. A lower chuck assembly used in a chucking apparatus of a tire uniformity machine comprising:
    a dual piston cylinder having an axially movable outer piston rod, an inner piston rod axially movable with respect to said outer piston rod, said inner piston rod having a stem opening;
    an inner piston stem detachably received in said stem opening and extending axially from said inner piston rod; and
    a nose cone shaft having a nose cone opening therethrough which slidably receives said inner piston stem.

12. The lower chuck assembly according to claim 11, wherein said nose cone opening is formed by an inner wall, wherein a base seat extends inwardly from said inner wall proximal one end of said nose cone shaft, and a nose cone plug with a grease fitting received in said nose cone opening at an end opposite said base seat, wherein lubricating fluid is fed into said nose cone opening through said grease fitting.

13. The lower chuck assembly according to claim 12, further comprising:
    a biasing mechanism which secures said inner piston stem within said nose cone opening, said inner piston stem having an axial orifice and at least one cross bore extending therethrough and intersecting with said axial orifice so as to allow lubricating fluid to pass therethrough.

14. The lower chuck assembly according to claim 13, wherein said nose cone shaft has at least one lube hole extending transversely therethrough and in communication with said nose cone opening, wherein said at least one cross bore is substantially aligned with said at least one lube hole.

15. The lower chuck assembly according to claim 14, wherein said nose cone shaft has a spacer seat extending from said inner wall at an end opposite said nose cone plug, wherein a spacer is received in said spacer seat, said spacer carrying a spacer thrust bearing and having a spacer cross hole extending therethrough, said spacer cross hole substantially aligned with said at least one cross bore and said at least one lube hole.

16. The lower chuck assembly according to claim 15, wherein said biasing mechanism comprises:
    a threaded nut secured to an end of said inner piston stem;
    a seat thrust bearing supported by said base seat; and
    a spring interposed between said threaded nut and said seat thrust bearing.

17. The lower chuck assembly according to claim 16, wherein said inner piston stem has a mid-cross bore and a lower-cross bore, both of which extend transversely therethrough and both of which intersect with said axial orifice; and
    said nose cone shaft having a spring lube hole substantially aligned with said mid-cross bore, and a spacer lube hole substantially aligned with said lower-cross bore.

18. The lower chuck assembly according to claim 12, further comprising:

a biasing mechanism that secures said inner piston stem within said nose cone opening;

said inner piston stem having an axial orifice, and a mid-cross bore and a lower-cross bore extending transversely therethrough and intersecting with said axial orifice;

said nose cone shaft having a spring lube hole extending transversely therethrough and substantially aligned with said mid-cross bore, and a spacer lube hole extending transversely therethrough and substantially aligned with said lower-cross bore, wherein lubricating fluid filled into said nose cone opening is flowable through said axial orifice into said mid-cross bore and said spring lube hole, and said lower-cross bore and said spacer lube hole to an exterior of said nose cone.

* * * * *